United States Patent
Forman et al.

(10) Patent No.: US 10,007,669 B1
(45) Date of Patent: Jun. 26, 2018

(54) METHODS AND SYSTEMS FOR EXPORTING AND CONVERTING PROPRIETARY FORMAT FILES COMPRISING A DIGITAL CONTENT WORK TO OPEN STANDARD FORMAT COMPATIBLE FILES

(71) Applicant: Inkling Systems, Inc., San Francisco, CA (US)

(72) Inventors: Joshua Forman, San Francsico, CA (US); William Schwarzenbach, San Francisco, CA (US)

(73) Assignee: Inkling Systems, Inc., San Francisco, CA (US)

( * ) Notice: Subject to any disclaimer, the term of this patent is extended or adjusted under 35 U.S.C. 154(b) by 808 days.

(21) Appl. No.: 14/177,775

(22) Filed: Feb. 11, 2014

Related U.S. Application Data

(60) Provisional application No. 61/763,328, filed on Feb. 11, 2013.

(51) Int. Cl.
  *G06F 17/30* (2006.01)
(52) U.S. Cl.
  CPC .............. *G06F 17/30076* (2013.01)
(58) Field of Classification Search
  CPC .................................. G06F 17/30076
  USPC ........................................ 707/827
  See application file for complete search history.

(56) References Cited

U.S. PATENT DOCUMENTS

| | | | | |
|---|---|---|---|---|
| 2007/0298399 A1* | 12/2007 | Shao | ............. | G06F 17/241 434/317 |
| 2012/0096087 A1* | 4/2012 | Curcelli | ............. | G06Q 10/101 709/204 |
| 2013/0174017 A1* | 7/2013 | Richardson | ............. | G06F 17/21 715/234 |
| 2013/0191728 A1* | 7/2013 | McKinney | ............. | G06F 17/211 715/243 |
| 2014/0095988 A1* | 4/2014 | Pegg | ............. | G06F 17/217 715/251 |

\* cited by examiner

*Primary Examiner* — Fred I Ehichioya
*Assistant Examiner* — Johnese Johnson
(74) *Attorney, Agent, or Firm* — Ascenda Law Group, PC

(57) ABSTRACT

Systems and methods for exporting and automatically converting files that make up a digital content work from a first proprietary format to a second format, the second format being a format compatible with an open standards format. Such automatic conversion includes parsing a designated table of contents metadata file to build a list of the files referenced therein. For one or more respective files identified from the table of contents metadata file, each respective file is converted to an HTML5 file, from which a set of EPUB (or other open standards format) -compatible metadata files are created. The EPUB files include a manifest and a spine, which, together with the HTML5 files, are collectively packaged in an EPUB (or other open standards format) container file for distribution.

13 Claims, 4 Drawing Sheets

3000

3010 Download files comprising the digital content work.

3020 Convert the downloaded files from the proprietary format to EPUB format.

3022 Parse ToC metadata file to build a list of the files referenced therein.

3024 For each file identified from the table of contents metadata file, convert the file to HTML5.

3026 Create EPUB-compatible metadata files.

3028 Package converted files and the newly created EPUB metadata files in an EPUB container file.

3030 Distribute EPUB publication via EPUB-compatible distribution channel.

FIG. 3

METHODS AND SYSTEMS FOR EXPORTING AND CONVERTING PROPRIETARY FORMAT FILES COMPRISING A DIGITAL CONTENT WORK TO OPEN STANDARD FORMAT COMPATIBLE FILES

RELATED APPLICATIONS

This application is a NONPROVISIONAL of, claims priority to and incorporates by reference in its entirety U.S. Provisional Application 61/763,328, filed Feb. 11, 2013.

FIELD OF THE INVENTION

The present invention relates to systems and methods for exporting and converting files that make up a digital content work from a first proprietary format to a second proprietary format (such as the MOBI format), or a format compatible with an open standard format, such as the EPUB open standard format or the like.

BACKGROUND

Digital content works (a.k.a. electronic content publications), such as electronic books, portions of such books, electronic magazines, etc., are typically created using a content creation platform, which in some instances may include content creation tools executing on one or more computer systems. Some of these platforms store the files that comprise the digital content works in proprietary formats suited for particular distribution channels (e.g., proprietary electronic stores, etc.). Content authors, however, may wish to have access to other distribution channels that require the digital content works be compatible with an open standards format, such as the EPUB open standard format promulgated by the International Digital Publishing Forum.

SUMMARY

Systems and methods for exporting and converting files that make up a digital content work from a first proprietary format to a second format, the second format being a format compatible with an open standards format, a second proprietary format or a semi-proprietary format, are described herein. In one embodiment, a plurality of files that collectively comprise a digital content work are downloaded to a content creation platform accessible by one or more client computers from a content storage system (e.g., through a client application suited for accessing the version control system, through a graphical user interface or command line interface or programmatically using an appropriate library to access the files at known locations within repositories of the content storage system); one or more of the downloaded files are automatically converted from a proprietary format in which they were stored in the content storage system to a format compatible with an open standards format (e.g., the EPUB open standard specification); and the digital content work is subsequently provided as one or more open standards format-compatible files (e.g., EPUB-compatible files) to an electronic distribution channel. The EPUB (or other open standards format)-compatible files may, in turn, be downloaded to one or more electronic reader devices via the electronic distribution channel.

In one embodiment, converting the files that comprise the digital content work from the proprietary format to the EPUB (or other open standards format)-compatible format includes parsing a designated table of contents metadata file to build a list of the files referenced therein; for one or more of the files identified from the table of contents metadata file, converting the respective file to an HTML5 file; creating a set of EPUB (or other open standards format)-compatible metadata files comprising a manifest and a spine; and packaging the HTML5 files, the manifest and the spine in an EPUB (or other open standards format) container file.

BRIEF DESCRIPTION OF THE DRAWINGS

The present invention is illustrated by way of example, but not limitation, in the figures of the accompanying drawings, in which:

FIG. 3 illustrates an example of a process for converting files of a digital content work that are formatted in a proprietary format to an open standards format, facilitating the porting of digital content works from proprietary content creation and storage systems to multiple different electronic marketplaces in accordance with embodiments of the present invention.

DETAILED DESCRIPTION

Described herein are systems and methods for exporting and converting proprietary format files that make up a digital content work to a format compatible with an open standards format, such as the EPUB open standard format or the like. In one example, the methods and systems concern digital content works (e.g., electronic books, portions of such books, electronic magazines, etc.) formatted in a proprietary manner used by the Habitat™ content creation platform provided by Inkling Systems, Inc. of San Francisco, Calif. Digital content works of this kind may include one or more interactive content presentation objects and one or more interactive assessment objects and are created by content authors using templates and input parameters which are converted by the Habitat system's content ingestion processes to a platform independent digital specification of the work. This process is discussed in greater detail in commonly assigned and co-pending U.S. Pat. Ser. No. 13/019,211, incorporated herein by reference. Discussion of such examples, however, is merely for purposes of explanation and the present invention is equally applicable to other kinds of digital content works.

For the subject digital content works, the platform independent digital specification along with the various electronic media therein is made available to users, who then execute the platform independent digital specification in an execution environment on an electronic reader. The execution environment presents the digital content work, or part of the digital content work, to the user by utilizing the instructions in the platform independent digital specification. The platform independent digital specification instructs the execution environment on the proper placement of the various media objects and the proper responses upon user interactions with the media. During the presentation of the work, the various pieces of the digital content work allow for various user interactions, some of which may be social in nature and allow for users to communicate with other users of the work.

Figure 1:
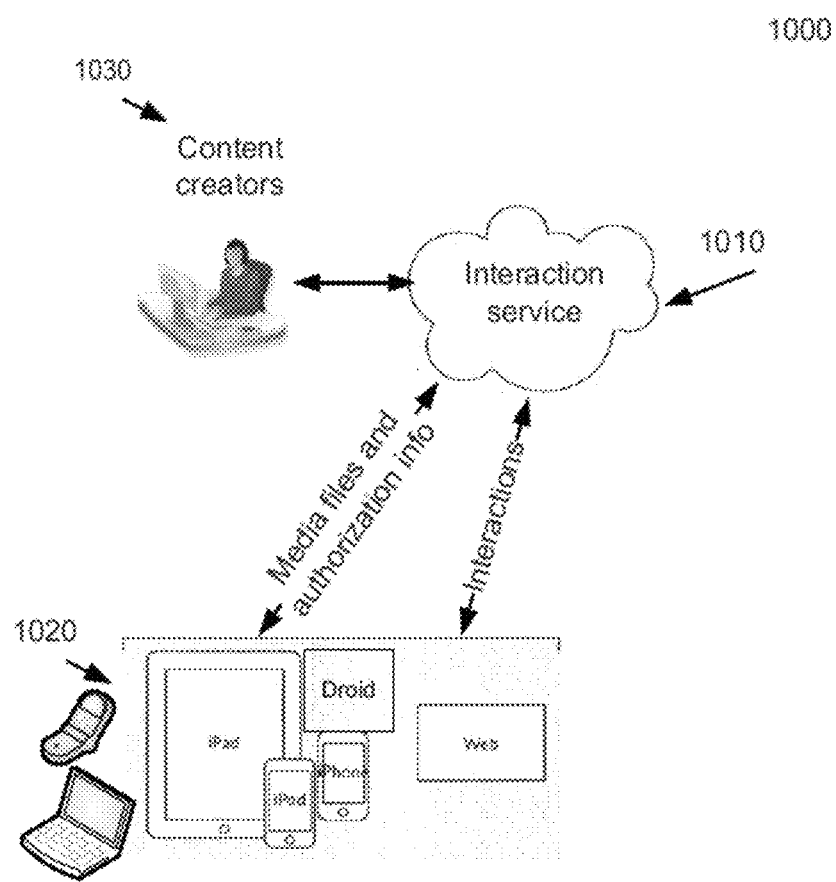
FIG. 1 illustrates an example of a digital content work creation and distribution environment within which embodiments of the present invention find application.

FIG. 1 shows an example of a digital content work creation and distribution environment 1000. This environment includes an interaction service 1010, electronic reader devices 1020, and content creators 1030. The interaction service 1010 receives content from content creators 1030 and transforms the content to a digital specification suitable for rendering by an execution environment (e.g., an electronic content work reader application) instantiated on the various electronic reader devices. As indicated above, in the case of the Habitat system, the digital specification is platform independent. In some examples, the content may be an electronic book. The digital specification is placed in storage (e.g., as part of an electronic store), from which users running execution environments on reader devices 1020 may download or otherwise access this content. The electronic reader devices 1020 present the content to the users of the electronic reader devices. Users may then interact with the content on the electronic reader devices 1020 and also with other users of the content through social networking applications running in the interaction service 1010. These user interactions are monitored by the interaction service and may form a basis for making future recommendations of the subject electronic book to potential purchasers thereof. Thus, the interaction service may include an electronic book or media marketplace where digital content works are made available for purchase. The store may include search capabilities and other features common to such facilities.

Figure 2:
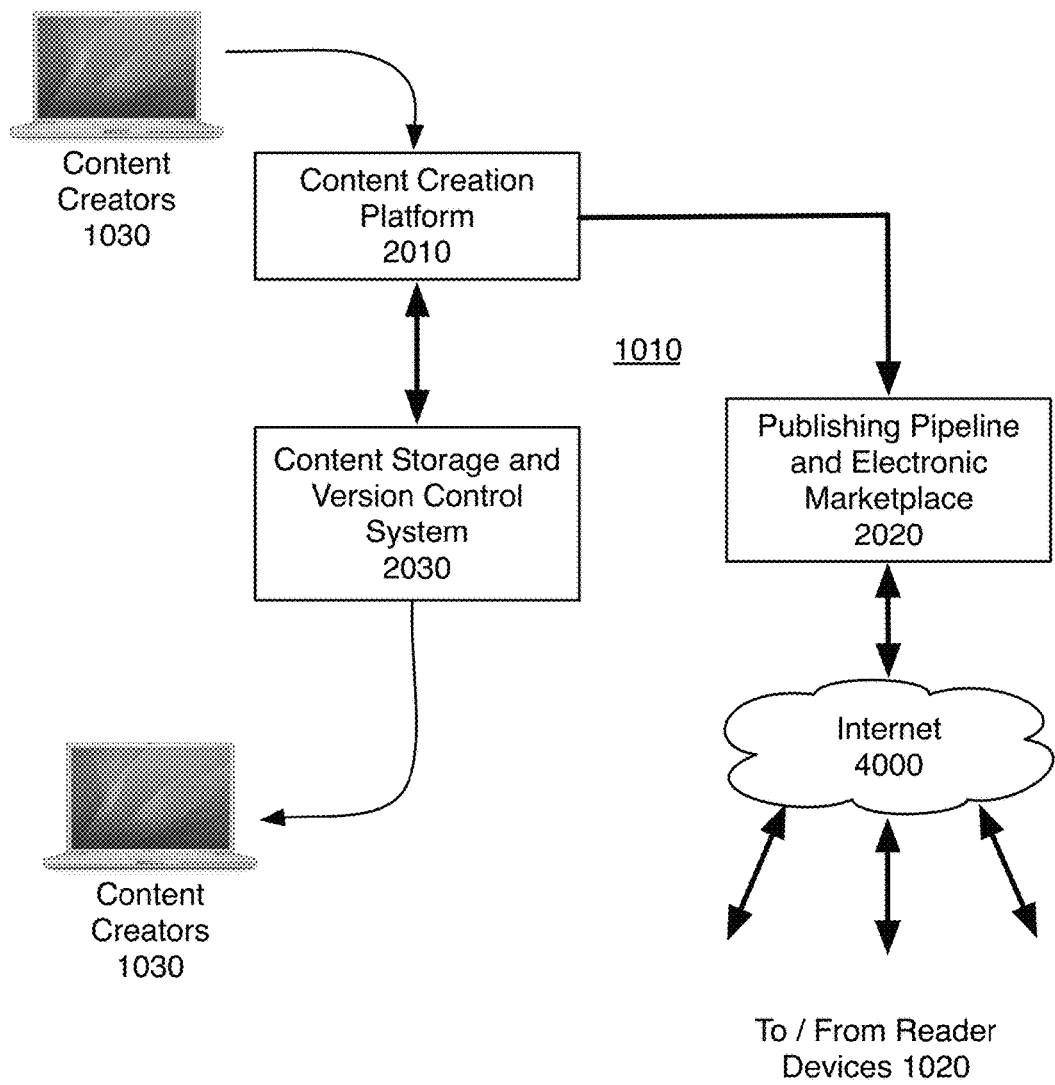
FIG. 2 illustrates in further detail aspects of an interaction service which is included as part of the digital content work creation and distribution environment shown in FIG. 1.

FIG. 2 illustrates in further detail some aspects of the interaction service 1010. Included therein are a content creation platform 2010, a publishing pipeline and electronic marketplace (for distributing the digital content works) 2020, and a content storage and version control system 2030. The content creation platform may be hosted on one or more servers or other computer-based resources and may be used by content creators to produce the digital content works that will ultimately be distributed through the electronic marketplace (e.g., via access through Internet 4000). During the content creation and editing process, the digital content works are stored in a content storage and version control system 2030. One example of such a system is the Subversion™ content storage system available from The Apache Software Foundation of Forest Hill, Md. The content storage and version control system 2030 allows for tracking of changes to the content that makes up the digital content work, allowing for precise control over the creation and editing process. The content storage and version control system includes one or more repositories (e.g., a logical grouping of files, often represented in a data structure, stored on one or more tangible computer-readable storage media) upon which copies of the files that comprise the digital content work are stored.

Content creators, editors and others have access to the content that makes up the digital content work both through the content creation platform and directly through the content version and control system. When accessed through the content creation platform, the content is generally made available through user interfaces designed to allow editing of text, images, graphics and other elements that make up the work. In the case of the Habitat system, additional features such as direct editing of markup language code and cascading style sheets that describe the layout and presentation of the content when rendered in an execution environment on a reader device are also provided. When accessed through the content storage and version control system, however, the digital content work consists of a plurality of files, some of which include the content of the work and others of which consist of metadata describing the structure of the work. For example, one or more such metadata files may describe hierarchical arrangements of others of the files such that when the execution environment running on an electronic reader device reads and/or executes the metadata file(s), the execution environment is instructed to present one or more of the content files in an order corresponding to a table of contents for the digital content work.

In some cases, at least some of the files created by the content creation platform and stored by the content storage and version control system will be formatted in a fashion unique to the particular interaction service 1010 in which they were created and/or stored. For example, while content files may be formatted in conventional hypertext markup language (HTML) and/or extensible markup language (XML) (or easily interpreted variants thereof), the metadata files describing the presentation and organization of the content files may be formatted in strictly proprietary fashions. This presents a problem for content creators that wish to publish their works through distribution channels other than the electronic marketplace associated with interaction service 1010. For example, although a content creator may directly download the files comprising his or her digital content work from the content storage and version control system, those files could not be directly used by a different publishing pipeline and electronic marketplace as those facilities would not be configured to accommodate files formatted in the proprietary fashion unique to interaction service 1010.

Many electronic marketplaces for digital content works and execution environments for electronic reader devices are configured to accommodate digital content works comprising files that are compatible with open standards formats, such as the EPUB open standard format. Therefore, by providing methods for converting files of a digital content work that are formatted in a proprietary format to the EPUB open standard format (or other open standards formats), the present invention facilitates the porting of digital content works from proprietary content creation and storage systems to multiple different electronic marketplaces. In other instances, electronic reader devices may be configured to accommodate digital content works that include files compatible with proprietary or semi-proprietary formats, such as the MOBI format used by the MobiPocket Reader, various versions of which are adapted for execution on smartphones, personal digital assistants, dedicated electronic reader platforms and the like.

FIG. 3 illustrates an example of such a process 3000. At 3010, the files that comprise the digital content work are downloaded from the content storage and version control system of the interaction service 1010. In some instances there may not be a version control system in use, or the files may be downloaded from an ancillary storage location. When downloaded from a version control system, the files may need to be downloaded through a client application suited for accessing the version control system through a graphical user interface or command line interface. Alternatively, this could be done programmatically using an appropriate library to access the files at known locations within the repositories of the version control system. Indeed, access to repository files in this fashion (e.g., through an appropriate application programming interface) may be preferred over other access modes.

At 3020, the downloaded files are automatically converted from the proprietary format of the interaction system 1010 to the EPUB format. The EPUB format is described in one or more specifications promulgated by the International Digital Publishing Forum. An EPUB publication is described as a logical document entity that is made up of a set of interrelated publication resources and packaged in an EPUB container file (essentially, a compact file suitable for distributing an EPUB publication). The publication resources are files containing content or instructions that contribute to the logic and rendering of the EPUB publication in an execution environment. For the most part, these publication resources must all be listed in a so-called manifest and must be bundled in the EPUB container file. The manifest then is a list of all publication resources that constitute the EPUB publication and typically is one of the files that will not be present in the proprietary files downloaded from the content storage and version control system 3020. Another important EPUB file is the spine, an ordered list of the publication resources specified in the manifest that represents the default reading order of the EPUB publication. This too is a file that will not have been present in proprietary files downloaded from the content storage and version control system 3020 and so must be created.

Finally, at 3030, the newly created EPUB file may be distributed to electronic reader devices via an EPUB compatible distribution channel (e.g., an EPUB compatible electronic marketplace). This distribution may involve uploading the newly created EPUB-compatible files into a publication pipeline associated with the EPUB-compatible electronic market place, registering the EPUB-compatible digital content work with the provider of that marketplace and other operations.

The conversion of the proprietary format files downloaded from the content storage and versioning control system to an EPUB-compatible form may be accomplished in several ways. In one example, highlighted in FIG. 3, the conversion may be accomplished by first parsing a designated table of contents metadata file to build a list of the files referenced therein 3022. This will provide an understanding of the structure of the digital content work as it was assembled by the content creation platform 2010.

Next, for each file identified from the table of contents metadata file, convert the file to an HTML5 file 3024. All EPUB publications are comprised of HTML5 files; therefore, all files downloaded from the content storage and version control system will have to be converted to HTML5 format. In some instances this may involve little or no conversion (e.g., if the content creation platform 2010 already uses HTML5-formatted files). In other instances, where, for example, proprietary XML files are used for enhanced electronic content publication features, this may involve parsing the subject file and building a custom HTML5 file from it. Alternatively, such files may be ignored in the content conversion process as EPUB execution environments that are not configured to render the custom electronic content publication features produced by the content creation platform 2010 will not have use for such files.

Once the downloaded files have been converted to HTML5, a set of EPUB-compatible metadata files need to be created 3026. This includes the manifest and spine files noted above. Collectively, the manifest and spine files comprise an EPUB table of contents, which is needed so that an EPUB-compatible execution environment will know in what order to render the other files that make up the digital content work.

Finally, the converted files and the newly created EPUB manifest and spine files will need to be packaged in an EPUB container file 3028. Usually this involves segregating the EPUB metadata files from the content files in separate, properly labeled folders within the container file. Once the container file has been assembled, it can be provided to the EPUB-compatible electronic marketplace for distribution. Alternatively, if no EPUB manifest and spine files were created, one could store the EPUB HTML5 files in a database and provide an interface that facilitates the proper ordered access to the individual files so that they would be consumed by a user through an execution environment in their intended order.

In alternative environments, the target format for the file conversion may not be an EPUB format. For example, the target format may be an open standard format, proprietary format or semi-proprietary format that does not require an ordered structure that includes a manifest and spine. In such instances, the conversion process may entail parsing the original structured files to create a linear representation of the presentation order of the content of the digital work and then storing converted HTML5 or other files in an order consistent with that linear representation. Tables of contents files may be produced by reading the HTML files and extracting chapter, section and other headings based on tags name/attribute filters appropriate to the digital content work, and adding anchors within the HTML at corresponding positions. Appropriate hyperlinks may then be generated from the anchors.

The execution environment for the electronic reader devices may be any convenient combination of hardware device, operating system and application program(s) and is often fashioned as an electronic reading device. The hardware and operating system layer provide the functions required to run application software, including the processor, system memory, storage, network interface, TCP/IP stack or other protocol stack, and application programming interfaces for the development of software applications. The hardware device and operating system may be of any variation including traditional PC-based operating systems, mobile device operating systems or network-based operating systems that abstract the hardware layer from the application programming interface. Some examples include Microsoft Windows, developed by Microsoft, Corp., Redmond, Wash., UNIX, LINUX, iOS™, MacOS™, ANDROID™, and the like. The application program(s) represents the user-level executable used to access the digital content work. Particular, non-limiting examples of electronic reading devices suitable for use in conjunction with the present invention include IPADs™ manufactured by APPLE, INC. of Cupertino Calif., NOOKs™, manufactured by BARNES AND NOBLE INC. of New York, N.Y., and KINDLEs™, manufactured by AMAZON.COM of Seattle Wash. In some other examples, the electronic reading device may be a laptop or desktop computer, or a smartphone such as the APPLE IPHONE™ or a smartphone running the ANDRIOD™ operating system provided by GOOGLE, INC. The electronic reading device may be any device with a display, an input mechanism, a processor, and electronic storage. Preferably, the digital content work itself is fashioned so as to be platform-agnostic, meaning that it will be compatible with a variety of electronic reading devices.

Figure 4:
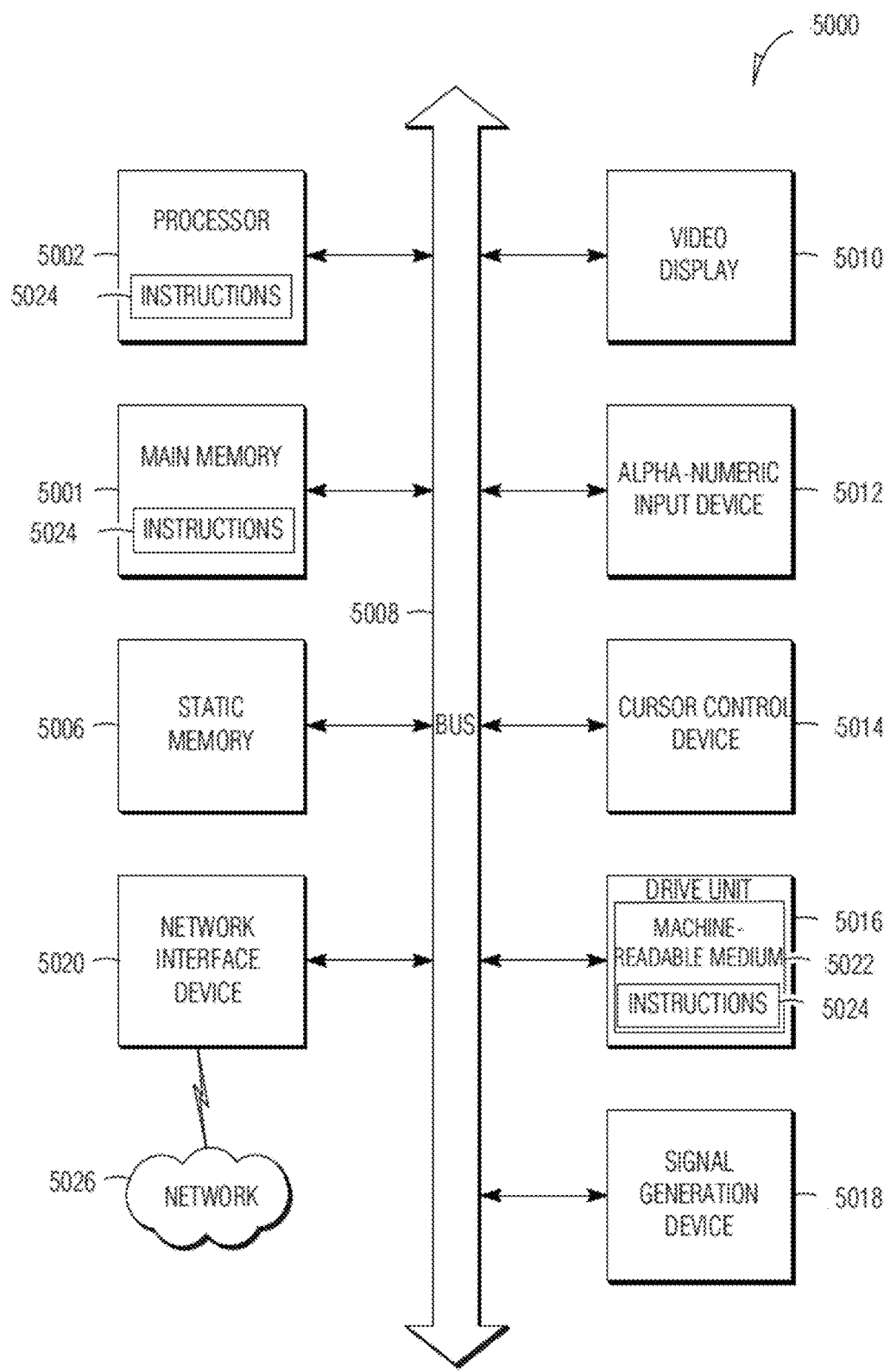
FIG. 4 illustrates an example form of a computer system within which a set of instructions for causing the computer system to perform any of the methods, processes, operations, or methodologies that embody the present invention may be executed.

FIG. 4 shows a diagrammatic representation of a machine in the example form of a computer system 5000 within which a set of instructions for causing the machine to perform any one or more of the methods, processes, operations, or methodologies discussed herein may be executed. Computer system 5000 may be one or more of the servers of the interactive service and includes a processor 5002 (e.g., a Central Processing Unit (CPU), a Graphics Processing Unit (GPU) or both), a main memory 5001 and a static memory 5006, which communicate with each other via a bus 5008. The computer system 5000 may further include a video display unit 5010 (e.g., a Liquid Crystal Display (LCD) or a Cathode Ray Tube (CRT)). The computer system 5000 may also include an alphanumeric input device 5012 (e.g., a keyboard), a User Interface (UI) cursor controller 5014 (e.g., a mouse), a disk drive unit 5016, a signal generation device 5018 (e.g., a speaker) and a network interface device 5020 (e.g., a transceiver) for connection to a network 5026.

The disk drive unit 5016 includes a machine-readable medium 5022 on which is stored one or more sets of instructions 5024 and data structures (e.g., software) embodying or used by any one or more of the methodologies or functions illustrated herein. The software may also reside, completely or at least partially, within the main memory 5001 and/or within the processor 5002 during execution thereof by the computer system 5000, the main memory 5001 and the processor 5002 also constituting machine-readable media. The term "machine-readable medium" should be taken to include a single medium or multiple media that store the one or more sets of instructions. The term "machine-readable medium" should also be taken to include any tangible (i.e., non-transitory) medium that is capable of storing, encoding, or carrying a set of instructions for execution by the machine and that cause the machine to perform any of the one or more of the methodologies illustrated herein. Examples of "machine-readable media" include, but are not be limited to, solid-state memories, and optical and magnetic media.

Method embodiments illustrated herein may be computer-implemented. Some embodiments may include machine-readable media encoded with a computer program (e.g., software), which includes instructions operable to cause an electronic device to perform methods of various embodiments. A software implementation (or computer-implemented method) may include microcode, assembly language code, or a higher-level language code, which further may include computer readable instructions for performing various methods. The code may form portions of computer program products. Further, the code may be tangibly stored on one or more volatile or non-volatile machine-readable media during execution or at other times. These machine-readable media may include, but are not limited to, hard disks, removable magnetic disks, removable optical disks (e.g., compact disks and digital video disks), magnetic cassettes, memory cards or sticks, Random Access Memories (RAMs), Read Only Memories (ROMs), and the like.

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A computer-implemented method comprising:
    downloading, from a content storage system, a plurality of files that collectively comprise a digital content work;
    automatically converting one or more of the downloaded files from a proprietary format in which they were stored in the content storage system to one or more electronic publication (EPUB)-compatible files having a format compatible with an EPUB specification by:
       parsing a table of contents metadata file for the digital content work to build a list of files referenced therein;
       for one or more respective files identified from the table of contents metadata file, converting the respective file into a respective HyperText Markup Language 5 (HTML5) file;
       creating a set of EPUB-compatible metadata files comprising a manifest and a spine; and
       packaging each respective HTML5 file, the manifest, and the spine in an EPUB container file, the EPUB container file comprising the one or more EPUB-compatible files; and
    providing the one or more EPUB-compatible files to an electronic distribution channel.

2. The method of claim 1, further comprising distributing the EPUB-compatible files to one or more electronic reader devices via the electronic distribution channel.

3. The method of claim 1, wherein the downloading is performed through a client application suitable for accessing the version control system through a graphical user interface or command line interface, or programmatically using an appropriate library to access the files at known locations within repositories of the content storage system.

4. The method of claim 1, wherein the digital content work includes one or more interactive content presentation objects and one or more interactive assessment objects.

5. The method of claim 1, wherein the digital content work comprises a platform independent digital specification of the work.

6. The method of claim 1, wherein the digital content work as stored in the content storage system comprises a proprietary markup language representation of the electronic content work.

7. A computer-implemented method comprising:
    automatically converting a plurality of files formatted in a proprietary format, said files collectively comprising a digital content work and including both content files that contain literary content of the work and metadata files describing presentation and organization elements for the content files, from the proprietary format to an open standard format compatible with a plurality of execution environments for electronic reading devices, said automatically converting the plurality of files including:
       parsing a table of contents metadata file to build a list of files referenced therein; for one or more respective files identified from the table of contents metadata file, converting the respective file to a respective HyperText Markup Language 5 (HTML5) file;
       creating a set of open standard format-compatible metadata files comprising a manifest and a spine; and
       packaging each respective HTML5 file, the manifest and the spine in a container file to create an open standard format-compatible file; and distributing the plurality of files converted to the open standard format-compatible files to the electronic reading devices via one or more electronic distribution channels, wherein the open standard compatible format specifies a logical document entity that is made up of a set of interrelated publication resources packaged in a container file, the publication resources comprising files containing content or instructions that contribute to rendering of the electronic content work in the execution environments.

8. The method of claim 7, wherein automatically converting the plurality of files further includes listing the publication resources in the manifest bundled in the container file.

9. The method of claim 8, wherein the open standard compatible format further specifies an ordered list of the publication resources specified in the manifest, which ordered list represents a default reading order of the files comprising the digital content work.

10. A computer-implemented method comprising:
automatically converting a plurality of files formatted in a proprietary format, said files collectively comprising a digital content work and including both content files that contain literary content of the work and metadata files describing presentation and organization elements for the content files, from the proprietary format to an open standard format compatible with a plurality of execution environments for electronic reading devices; and distributing the plurality of files converted to the open standard format-compatible files to the electronic reading devices via one or more electronic distribution channels, wherein automatically converting the plurality of files includes creating a set of open standard format-compatible metadata files including a manifest file and a spine file, which collectively comprise a table of contents, specifying an order in which the execution environments should render other files that make up the digital content work.

11. The method of claim 10, further comprising packaging the one or more open standard format-compatible files, manifest files and spine files in a container file for distribution to the electronic reading devices via one or more electronic distribution channels.

12. The method of claim 11, wherein packaging comprises segregating metadata files from content files in separate folders within the container file.

13. The method of claim 7, wherein automatically converting the plurality of files includes further ignoring those files of the digital content work that are not formatted in a hypertext markup language as part of the conversion process.

* * * * *